(12) United States Patent
Langhammer

(10) Patent No.: US 8,886,695 B1
(45) Date of Patent: *Nov. 11, 2014

(54) NORMALIZATION OF FLOATING POINT OPERATIONS IN A PROGRAMMABLE INTEGRATED CIRCUIT DEVICE

(75) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 316 days.

This patent is subject to a terminal disclaimer.

(21) Appl. No.: 13/545,405

(22) Filed: Jul. 10, 2012

Related U.S. Application Data

(63) Continuation of application No. 12/048,379, filed on Mar. 14, 2008, now Pat. No. 8,244,789.

(51) Int. Cl.
G06F 7/38 (2006.01)

(52) U.S. Cl.
USPC .......................................... 708/497; 708/503

(58) Field of Classification Search
CPC ....... G06F 7/48; G06F 7/5443; G06F 7/5095; G06F 7/4991; G06F 7/49921; G06F 5/01; G06F 7/57; G06F 9/3001; G06F 7/572; G06F 7/49947; G06F 7/49957; G06F 7/49936; G06F 7/485
USPC ......................................... 708/497, 552–553
See application file for complete search history.

(56) References Cited

U.S. PATENT DOCUMENTS

| | | |
|---|---|---|
| 3,473,160 A | 10/1969 | Wahlstrom |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,521,907 A | 6/1985 | Amir et al. |
| 4,597,053 A | 6/1986 | Chamberlin |

(Continued)

FOREIGN PATENT DOCUMENTS

| | | |
|---|---|---|
| EP | 0 158 430 | 10/1985 |
| EP | 0 380 456 | 8/1990 |

(Continued)

OTHER PUBLICATIONS

Amos, D., "PLD architectures match DSP algorithms " *Electronic Product Design*, vol. 17, No. 7, Jul. 1996, pp. 30, 32.

(Continued)

*Primary Examiner* — Tan V. Mai
(74) *Attorney, Agent, or Firm* — Ropes & Gray LLP; Jeffrey H. Ingerman

(57) ABSTRACT

A programmable integrated circuit device is programmed to normalize multiplication operations by examining the input or output values to determined the likelihood of overflow or underflow and then to adjust the input or output values accordingly. The examination of the inputs can include an examination of the number of adder stages feeding into the inputs, as well as a count of leading bits ahead of the first significant bit. Adjustment of an input can include shifting the mantissa by the leading bit count and adjusting the exponent accordingly, while adjustment of the output can include shifting the mantissa by the sum of the leading bit counts of the inputs and adjusting the exponent accordingly. Or the output can be examined to find its leading bit count and the output then can be adjusted by shifting the mantissa by the leading bit count and adjusting the exponent accordingly.

20 Claims, 7 Drawing Sheets

(56) References Cited

U.S. PATENT DOCUMENTS

| | | |
|---|---|---|
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,791,590 A | 12/1988 | Ku et al. |
| 4,799,004 A | 1/1989 | Mori |
| 4,823,295 A | 4/1989 | Mader |
| 4,839,847 A | 6/1989 | Laprade |
| 4,871,930 A | 10/1989 | Wong et al. |
| 4,912,345 A | 3/1990 | Steele et al. |
| 4,967,160 A | 10/1990 | Quievy et al. |
| 4,982,354 A | 1/1991 | Takeuchi et al. |
| 4,994,997 A | 2/1991 | Martin et al. |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,349,250 A | 9/1994 | New |
| 5,357,152 A | 10/1994 | Jennings, III et al. |
| 5,371,422 A | 12/1994 | Patel et al. |
| 5,381,357 A | 1/1995 | Wedgwood et al. |
| 5,404,324 A | 4/1995 | Colon-Bonet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,522 A | 7/1997 | Moyse et al. |
| 5,646,545 A | 7/1997 | Trimberger et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,340 A | 3/2000 | Mintzer |
| 6,052,327 A | 4/2000 | Reddy et al. |
| 6,052,755 A | 4/2000 | Terrill et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,130,554 A | 10/2000 | Kolze et al. |
| 6,140,839 A | 10/2000 | Kaviani et al. |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |

(56) References Cited

U.S. PATENT DOCUMENTS

| | | |
|---|---|---|
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,351,142 B1 | 2/2002 | Abbott |
| 6,359,468 B1 | 3/2002 | Park et al. |
| 6,362,650 B1 | 3/2002 | New et al. |
| 6,366,944 B1 | 4/2002 | Hossain et al. |
| 6,367,003 B1 | 4/2002 | Davis |
| 6,407,576 B1 | 6/2002 | Ngai et al. |
| 6,407,694 B1 | 6/2002 | Cox et al. |
| 6,438,570 B1 | 8/2002 | Miller |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,591,283 B1 | 7/2003 | Conway et al. |
| 6,591,357 B2 | 7/2003 | Mirsky |
| 6,600,788 B1 | 7/2003 | Dick et al. |
| 6,628,140 B2 | 9/2003 | Langhammer et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,744,278 B1 | 6/2004 | Liu et al. |
| 6,745,254 B2 | 6/2004 | Boggs et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,836,839 B2 | 12/2004 | Master et al. |
| 6,874,079 B2 | 3/2005 | Hogenauer |
| 6,904,471 B2 | 6/2005 | Boggs et al. |
| 6,924,663 B2 | 8/2005 | Masui et al. |
| 6,971,083 B1 | 11/2005 | Farrugia et al. |
| 7,912,883 B2 | 3/2011 | Hussain |
| 2001/0029515 A1 | 10/2001 | Mirsky |
| 2002/0089348 A1 | 7/2002 | Langhammer |
| 2003/0088757 A1 | 5/2003 | Lindner et al. |
| 2004/0064770 A1 | 4/2004 | Xin |
| 2004/0083412 A1 | 4/2004 | Corbin et al. |
| 2004/0178818 A1 | 9/2004 | Crotty et al. |
| 2004/0193981 A1 | 9/2004 | Clark et al. |
| 2005/0144215 A1 | 6/2005 | Simkins et al. |
| 2005/0166038 A1 | 7/2005 | Wang et al. |
| 2005/0187999 A1 | 8/2005 | Zheng et al. |
| 2007/0185951 A1 | 8/2007 | Lee et al. |
| 2007/0185952 A1 | 8/2007 | Langhammer et al. |

FOREIGN PATENT DOCUMENTS

| | | |
|---|---|---|
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 7-135447 | 5/1995 |
| WO | WO95/27243 | 10/1995 |
| WO | WO96/28774 | 9/1996 |
| WO | WO97/08606 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO2005/101190 | 10/2005 |

OTHER PUBLICATIONS

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FOL 2000. Proceedings* (*Lecture Notes in Computer Science vol. 1896*) Aug. 27-30, 2000, pp. 456-461.

Aoki, T., "Signed-weight arithmetic and its application to a field-programmable digital filter architecture," *IEICE Transactions on Electronics*, vol. E82C, No. 9, Sep. 1999, pp. 1687-1698.

Ashour, M.A., et al., "An FPGA implementation guide for some different types of serial-parallel multiplier-structures," *Microelectronics Journal*, vol. 31, No. 3, 2000, pp. 161-168.

Berg. B.L., et al. "Designing Power and Area Efficient Multistage FIR Decimators with Economical Low Order Filters," *ChipCenter Technical Note*, Dec. 2001.

Bursky, D., "Programmable Logic Challenges Traditional ASIC SOC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.

Gaffar, A.A., et al., "Floating-Point Bitwidth Analysis via Automatic Differentiation," *IEEE Conference on Field Programmable Technology*, Hong Kong, Dec. 2002.

(56) References Cited

OTHER PUBLICATIONS

Guccione, S.A., "Run-time Reconfiguration at Xilinx" *Parallel and distributed processing: 15 IPDPS 2000 workshops*, Rolim, J., ed., May 1-5, 2000, p. 873.
Hauck, S., "The Future of Reconfigurable Systems," *Keynote Address, 5th Canadian Conference on Field Programmable Devices*, Jun. 1998, http://www.ee.washington.edu/people/faculty/hauck/publications/ReconfigFuture.PDF.
Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science vol. 1896)*, Aug. 27-30, 2000, pp. 400-411.
Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.
Lattice Semiconductor Corp, *ORCA ® FPGA Express™ Interface Manual:ispLEVER® Version 3.0*, 2002.
Lucent Technologies, Microelectronics Group, "Implementing and Optimizing Multipliers in ORCA™ FPGAs," Application Note. AP97-008FGPA, Feb. 1997.
"Implementing Multipliers in FLEX 10K EABs", *Altera*, Mar. 1996.
"Implementing Logic with the Embedded Array in FLEX 10K Devices", *Altera*, May 2001, ver. 2.1.
Jinghua Li, "Design a pocket multi-bit multiplier in FPGA," *1996 2nd International Conference on ASIC Proceedings (IEEE Cat. No.96TH8140)*, Oct. 21-24, 1996, pp. 275-279.
Jones, G., "Field-programmable digital signal conditioning," *Electronic Product Design*, vol. 21, No. 6, Jun. 2000, pp. C36-C38.
Kiefer, R., et al., "Performance comparison of software-FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.
Kramberger, I., "Dsp acceleration using a reconfigurable Fpga" Isie '99 Proceedings of the IEEE International Symposium on Industrial Electronics (Cat no. 99TH8465), vol. 3, Jul. 12-16, 1999, pp. 1522-25.
Langhammer, M., "How to implement DSP in programmable logic," *Elettronica Oggi*, No. 266, Dec. 1998, pp. 113-115.
Langhammer, M., "Implementing a DSP in Programmable Logic," *Online EE Times*, May 1998, http://www.eetimes.com/editorial/1998/coverstory9805.html.
Lazaravich, B.V., "Function block oriented field programmable logic arrays," *Motorola, Inc. Technical Developments*, vol. 18, Mar. 1993, pp. 10-11.
Lund, D., et al., "A new development system for reconfigurable digital signal processing," First International Conference on 3G Mobile Communication Technologies (Conf. Publ. No. 471), Mar. 27-29, 2000, pp. 306-310.
Miller, n. L., et al., "Reconfigurable integrated circuit for high performance computer arithmetic," *Proceedings of the 1998 IEE Colloquium on Evolvable Hardware Systems (Digest)*, No. 233, 1998, pp. 2-1-2-4.
Mintzer, L., "Xilinx FPGA as an FFT processor," *Electronic Engineering*, vol. 69, No. 845, May 1997, pp. 81, 82, 84.
Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.
Nozal, L., et al., "A new vision system: programmable logic devices and digital signal processor architecture (PLD+DSP)," *Proceedings IECON '91. 1991 International Conference on Industrial Electronics, Control and Instrumentation* (Cat. No. 91CH2976-9), vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.
Parhami, B., "Configurable arithmetic arrays with data-driven control," *34th Asilomar Conference on Signals, Systems and Computers*, vol. 1, 2000, pp. 89-93.
"The QuickDSP Design Guide", Quicklogic, Aug. 2001, revision B.
"QuickDSP™ Family Data Sheet", *Quicklogic*, Aug. 7, 2001, revision B.
Rangasayee, K., "Complex PLDs let you produce efficient arithmetic designs," *EDN (European Edition)*, vol. 41, No. 13, Jun. 20, 1996, pp. 109, 110, 112, 114, 116.
Rosado, A., et al., "A high-speed multiplier coprocessor unit based on FPGA," *Journal of Electrical Engineering*, vol. 48, No. 11-12, 1997, pp. 298-302.
Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303) Jul. 26-28, 1999, pp. 147-150.
Texas Instruments Inc., "TMS320C54x DSP Reference Set, vol. 1: CPU and Peripherals", Literature Number: SPRU131F, Apr. 1999, pp. 2-1 through 2-16 and 4-1 through 4-29.
Tisserand, A., et al., "An on-line arithmetic based FPGA for low power custom computing," *Field Programmable Logic and Applications, 9th International Workshop, FPL'99, Proceedings (Lecture Notes in Computer Science vol. 1673)*, Lysaght, P., et al., eds., Aug. 30-Sep. 1, 1999, pp. 264-273.
Tralka, C., "Symbiosis of DSP and PLD," *Elektronik*, vol. 49, No. 14, Jul. 11, 2000, pp. 84-96.
Valls, J., et al., "A Study About FPGA-Based Digital Filters," *Signal Processing Systems*, 1998 SIPS 98, 1998 IEEE Workshop, Oct. 10, 1998, pp. 192-201.
"Virtex-II 1.5V Field-Programmable Gate Arrays", *Xilinx*, Jan. 25, 2001, module 2 of 4.
"Virtex-II 1.5V Field-Programmable Gate Arrays", *Xilinx*, Apr. 2, 2001, module 1 of 4.
"Virtex-II 1.5V Field-Programmable Gate Arrays", *Xilinx*, Apr. 2, 2001, module 2 of 4.
Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.
Wenzel, L., "Field programmable gate arrays (FPGAs) to replace digital signal processor integrated circuits," *Elektronik*, vol. 49, No. 5, Mar. 7, 2000, pp. 78-86.
Weisstein, E.W., "Karatsuba Multiplication" *MathWorld—A Wolfram Web Resource* (Dec. 9, 2007), accessed Dec. 11, 2007 at http:--mathworld.wolfram.com-KaratsubaMultiplication.html.
"Xilinx Unveils New FPGA Architecture to Enable High-Performance, 10 Million System Gate Designs", *Xilinx*, Jun. 22, 2000.
"Xilinx Announces DSP Algorithms, Tools and Features for Virtex-II Architecture", *Xilinx*, Nov. 21, 2000.
Xilinx Inc., "Virtex-II 1.5V Field-Programmable Gate Arrays", Advance Product Specification, DS031-2 (v1.9), Nov. 29, 2001, Module 2 of 4, pp. 1-39.
Xilinx Inc., "Using Embedded Multipliers", Virtex-II Platform FPGA Handbook, UG002 (v1.3), Dec. 3, 2001, pp. 251-257.
Xilinx, Inc., "A 1D Systolic FIR," copyright 1994-2002, downloaded from http://www.iro.umontreal.ca/~aboulham/F6221/Xilinx%20A%201D%20systolic%20FIR.htm.
Xilinx, Inc., "The Future of FPGA's," White Paper, available Nov. 14, 2005 for download from http://www.xilinx.com-prs_rls,5yrwhite.htm.

NORMALIZATION OF FLOATING POINT OPERATIONS IN A PROGRAMMABLE INTEGRATED CIRCUIT DEVICE

CROSS REFERENCE TO RELATED APPLICATION

This is a continuation of, commonly-assigned U.S. patent application Ser. No. 12/048,379, filed Mar. 14, 2008, now U.S. Pat. No. 8,244,789, which is hereby incorporated by reference herein in its entirety.

BACKGROUND OF THE INVENTION

This invention relates to performing floating point arithmetic operations in programmable integrated circuit devices such as, e.g., programmable logic devices (PLDs). More particularly, this invention relates to normalization techniques for floating point operations.

As applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, PLDs sold by Altera Corporation, of San Jose, Calif., as part of the STRATIX® family, include DSP blocks, each of which may include four 18-by-18 multipliers. Each of those DSP blocks also may include adders and registers, as well as programmable connectors (e.g., multiplexers) that allow the various components to be configured in different ways. In each such block, the multipliers can be configured not only as four individual 18-by-18 multipliers, but also as four smaller multipliers, or as one larger (36-by-36) multiplier. In addition, one 18-by-18 complex multiplication (which decomposes into two 18-by-18 multiplication operations for each of the real and imaginary parts) can be performed. In order to support four 18-by-18 multiplication operations, the block has 4×(18+18)=144 inputs. Similarly, the output of an 18-by-18 multiplication is 36 bits wide, so to support the output of four such multiplication operations, the block also has 36×4=144 outputs.

The arithmetic operations to be performed by a PLD frequently are floating point operations. However, to the extent that known PLDs, with or without DSP blocks or other specialized blocks or structures, including the aforementioned STRATIX® PLDs, can perform floating point operations at all, they operate in accordance with the IEEE754-1985 standard, which requires that values be normalized at all times because the standard implies a leading "1". However, normalization is expensive in terms of device area as well as operational latency.

SUMMARY OF THE INVENTION

The present invention relates to PLDs having improved floating point operation capabilities. In particular, the present invention carries out floating point operations with sufficient normalization to prevent overflow or underflow of the result. In some cases, that may mean that there is no normalization, which, as long as the result can be trusted—i.e., as long as it does not overflow or underflow or otherwise result in a loss of precision—is the most efficient mode of operation. In other cases, normalization to the full requirements of the IEEE754-1985 standard may be performed because that is the only way to prevent overflow or underflow or other loss of precision. In intermediate cases, greater or lesser degrees of normalization may be carried out. In any case, the final result is typically normalized for IEEE754-1985 compliance before it is output, because most external devices expect the result in that format.

Therefore, in accordance with the present invention, there is provided a method of configuring a programmable integrated circuit device to perform a floating point multiplication operation on multiplicand input values each formatted with a respective input mantissa/exponent pair, to provide an output value formatted with an output mantissa/exponent pair. The method includes configuring logic of the programmable integrated circuit device to examine the values to determine likelihood of overflow/underflow of the multiplication operation, and configuring logic of the programmable integrated circuit device to, based on that likelihood, adjust one of (a) at least one of the respective input mantissa and input exponent, and (b) the output mantissa and output exponent, to prevent overflow/underflow of the multiplication operation.

A programmable logic device so configured, and a machine-readable data storage medium encoded with software for performing the method, are also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
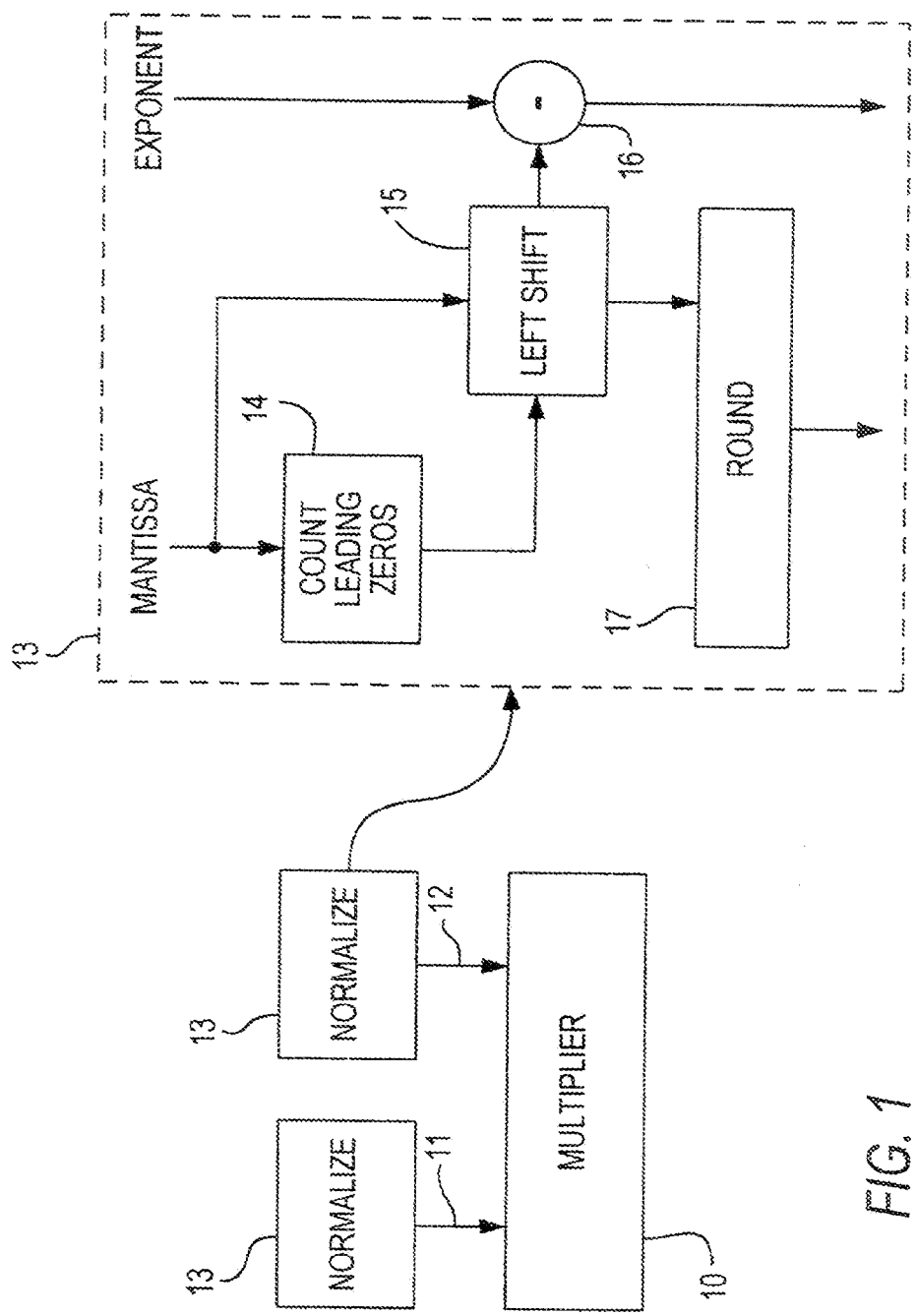
FIG. 1 is an example of a normalization configuration and method according to one embodiment of the present invention.

Floating point numbers are commonplace for representing real numbers in scientific notation in computing systems. Examples of real numbers in scientific notation are:

$3.14159265_{10} \times 10^0$ ($\pi$)
$2.718281828_{10} \times 10^0$ (e)
$0.000000001_{10}$ or $1.0_{10} \times 10^{-9}$ (seconds in a nanosecond)
$3155760000_{10}$ or $3.15576_{10} \times 10^9$ (seconds in a century)

The first two examples are real numbers in the range of the lower integers, the third example represents a very small fraction, and the fourth example represents a very large integer. Floating point numbers in computing systems are designed to cover the large numeric range and diverse precision requirements shown in these examples. Fixed point number systems have a very limited window of representation which prevents them from representing very large or very small numbers simultaneously. The position of the notional binary-point in fixed point numbers addresses this numeric range problem to a certain extent but does so at the expense of precision. With a floating point number the window of representation can move, which allows the appropriate amount of precision for the scale of the number.

Floating point representation is generally preferred over fixed point representation in computing systems because it permits an ideal balance of numeric range and precision. However, floating point representation requires more complex implementation compared to fixed point representation.

The IEEE754-1985 standard is commonly used for floating point numbers. A floating point number includes three different parts: the sign of the number, its mantissa and its exponent. Each of these parts may be represented by a binary number and, in the IEEE754-1985 format, have the following bit sizes:

|  | Sign | Exponent | Bias | Mantissa |
| --- | --- | --- | --- | --- |
| Single Precision 32-Bit | 1 bit [31] | 8 bits [30 ... 23] | −127 | 23 bits [22 ... 00] |
| Double Precision 64-Bit | 1 bit [63] | 11 bits [62 ... 52] | −1023 | 52 bits [51 ... 0] |

The exponent preferably is an unsigned binary number which, for the single precision format, ranges from 0 to 255. In order to represent a very small number, it is necessary to use negative exponents. To achieve this the exponent preferably has a negative bias associated with it. For single-precision numbers, the bias preferably is −127. For example a value of 140 for the exponent actually represents (140−127) =13, and a value of 100 represents (100−127)=−27. For double precision numbers, the exponent bias preferably is −1023.

As discussed above, according to the standard, the mantissa is a normalized number—i.e., it has no leading zeroes and represents the precision component of a floating point number. Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision. Therefore, in single precision format, the mantissa typically includes 24 bits of precision.

However, the IEEE754-1985 standard requires continuous normalization—i.e., normalization after every step of a multistep computation—to maintain the leading "1" to preserve accuracy. This is expensive in terms of PLD resources, as each normalization operation requires two steps—(1) finding the position of the "1", and (2) shifting the fractional part to get a leading "1" (which is then eliminated, because it is implied).

Copending, commonly-assigned U.S. patent application Ser. No. 11/625,655, filed Jan. 22, 2007, the contents of which are hereby incorporated by reference herein in their entirety, discloses a method of performing floating point operations without an implied leading "1", so that normalization is not required. The results are normalized only for output to outside devices that expect numbers according to the IEEE754-1985 standard. However, as disclosed in the aforementioned application, normalization may be required at some intermediate steps to prevent loss of data. The present invention provides a way to perform that intermediate normalization without necessarily normalizing to the IEEE754-1985 standard. Instead, only as much normalization as is required to prevent loss of data might be performed.

As mentioned above, normalization may not be required after every operation. For example, in an adder tree, the dynamic range of the mantissa can increase, but only by a maximum of one bit position per addition or subtraction operation. Therefore, the risk of overflow or underflow in addition or subtraction operations is small.

In multiplication, the effect of wordgrowth is much larger than in addition, as the wordgrowth is the sum of the wordgrowth of the inputs. For example, if the inputs to an operation are 8 and 8 (wordgrowth of 3 bits over the original 1.0), the maximum result of an addition is 16 (wordgrowth of 4 bits), while the maximum result for a multiplication is 64 (wordgrowth of 6 bits).

Nevertheless, even when two numbers are multiplied together, it may not be necessary that they be normalized. For example, the multiplier sizes natively supported by some PLDs (such as the 36-by-36 multipliers of the aforementioned STRATIX® family) are much larger than the mantissa sizes for single precision IEEE754-1985 floating point operations, which are 24-by-24. Therefore, significant overflow and underflow space can be provided.

For example, for an IEEE754-1985 input having 23 mantissa bits, four overflow bits and seven underflow bits can be provided in a 36-bit representation, as follows: one sign bit, four overflow bits, one bit to make the implied leading "1" explicit, followed by 23 bits of the original mantissa data, leaving seven bits for underflow.

The result will be displaced from the original decimal place by the sum of the displacements of the inputs. For example, "001XX.XX ... XX"×"001XX.XX ... XX" will generate at least 1XXXX.XX, which is an overflow. This can happen very quickly. For a normalized number, the maximum value is $1.999 \ldots 999_{10}$. Adding two numbers together can generate a maximum of $3.999 \ldots 9999_{10}$. Multiplying two numbers that are the sum of two other numbers each can generate a maximum of $15.99999_{10}$. If the total number of unnormalized inputs to a multiplier is less than six, then the maximum output of the multiplier is $31.99 \ldots 99_{10}$, which can be accommodated by the overflow bits. Of course, underflow can happen at the same rate, so it is possible that the precision of the number can decrease rapidly as well.

In a method according to the invention for configuring a programmable logic device to perform floating point operations, the programmable logic device may be configured to determine whether normalization is needed by examining whether overflow or underflow is possible in a datapath. One way of making such a determination is to examine the possible wordgrowth in the datapath assuming extremes of the possible inputs to the datapath. Another way of making such a determination is to examine the particular inputs to the datapath. Both techniques may be used in accordance with the invention.

In the discussion below of the latter technique, reference will be made to a "count-leading-zeroes" ("CLZ") circuit or function. This function is used to find the first significant digit. Although referred to as "count leading zeroes," it may also count leading ones, such as in the case of signed numbers where the number is negative, in which case the first "0" is found. The number can then be normalized by left shifting it by the number of leading "zeros" (which may be ones or zeroes as just discussed)—i.e., by the index of the first significant bit. The result of normalizing based on the CLZ count may or may not be the same as IEEE754-1985 normalization.

The examples that follow illustrate how normalization may be performed by a programmable integrated circuit device, such as a PLD, configured in accordance with embodiments of the invention.

In a first example, not shown in a drawing, the device is configured so that normalization is not performed on an input to a multiplier if the cluster feeding the multiplier cannot overflow the multiplier. For example, in the case of a numeric format as described above having four overflow bits, if the total number of sums in the two multiplier inputs is five or fewer, no normalization is required. It will be understood that if a different number of overflow bits is provided, the number of additions that allowed to be present in the input cluster before normalization is required should be adjusted accordingly.

In a second example, illustrated in FIG. 1, the device is configured so that the mantissa of each input 11, 12 to multiplier 10 is normalized at 13. While the IEEE754-1985 format may be used, it is not required (i.e., there need not be an implied leading "1"). The only requirement for this example is that the mantissa be less than 2. The numerical format need not, but may, include overflow bits. CLZ function 14 (which may be implemented as a circuit in the programmed device) is used to find the index of the first significant bit in operand 11 or 12, and that index is used by left-shift circuit/function 15 to left-shift the mantissa. The exponent is adjusted by subtracting the mantissa shift (i.e., the CLZ index value) at 16. The mantissa optionally may be rounded at 17.

Figure 2:
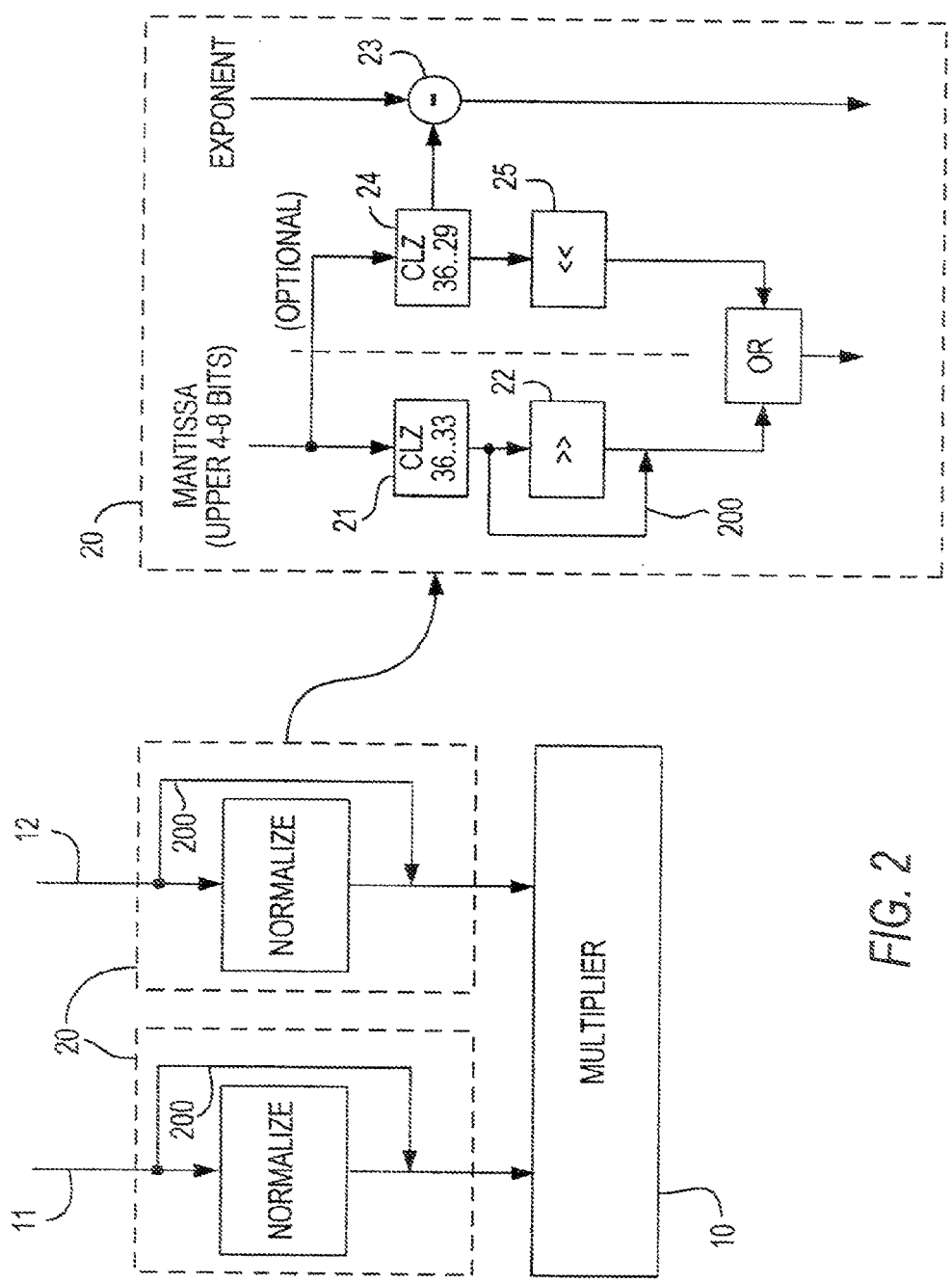
FIG. 2 is an example of a normalization configuration and method according to another embodiment of the present invention.

In a third example, illustrated in FIG. 2 for only one multiplier input (but used for both inputs), the device is configured so that normalization 20 includes checking at CLZ 21 for non-zero overflow bits (e.g., bits 36 . . . 33 in a 36-bit number). If there are overflow bits, then the number is right-shifted at 22 and the appropriate adjustment of the exponent is made at 23. If there are no overflow bits, then the number is smaller than $1.99_{10}$ and no normalization is required, and normalization is bypassed at 200. However, in this case, optionally a local underflow check may made at CLZ 24 of the bits (e.g., bits 32 . . . 29 in a 36-bit number) immediately to the right of the decimal point (not a check of the underflow bits—e.g., bits 7 . . . 1—of the mantissa representation as described above). If those bits are all zeroes, then loss of precision could occur, and therefore the number may be left-shifted at 25 and the appropriate adjustment of the exponent may be made at 23.

Figure 3:
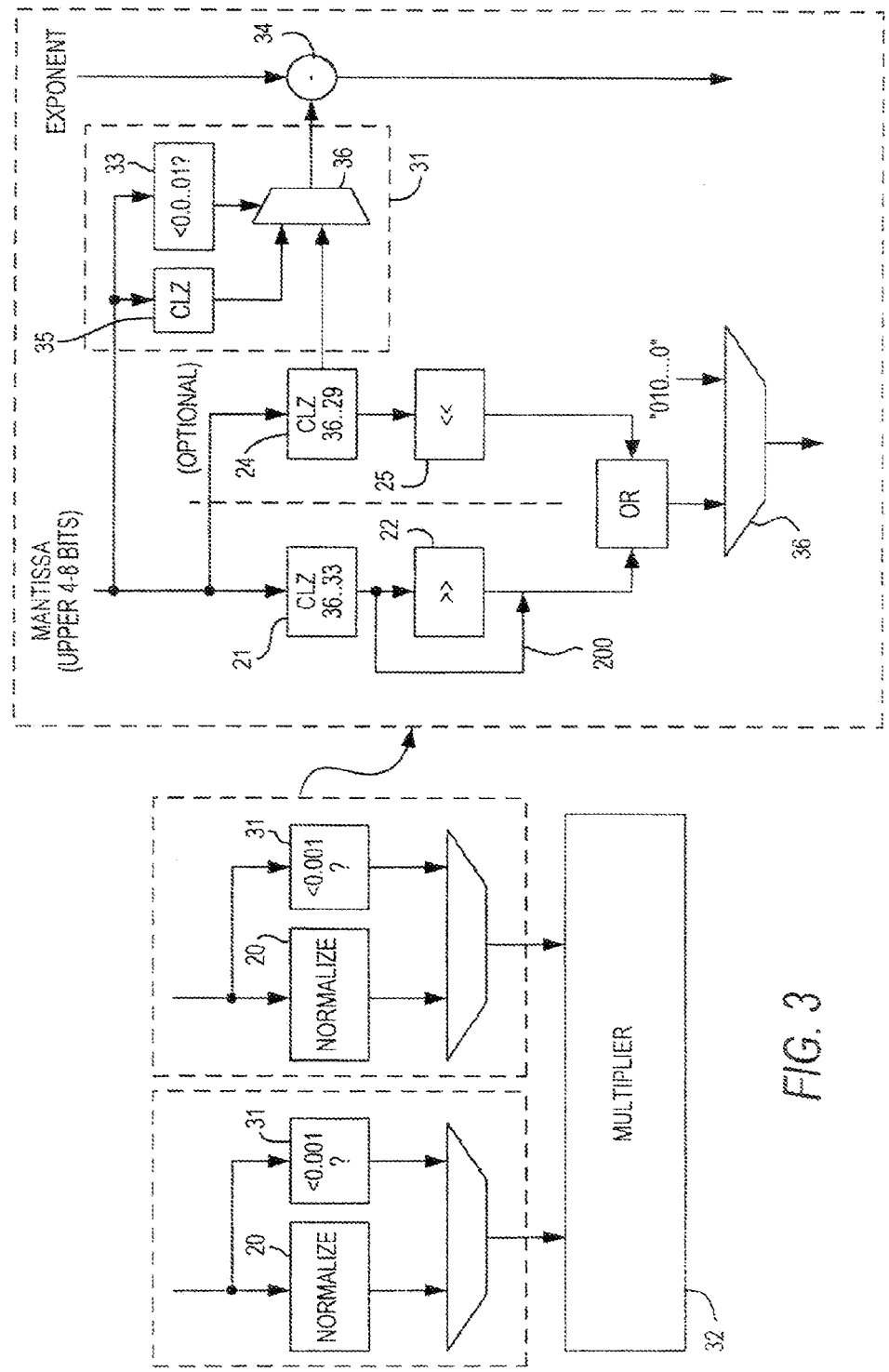
FIG. 3 is an example of a normalization configuration and method according to another embodiment of the present invention.

In a fourth example, illustrated in FIG. 3, the device is configured so that normalization 30 includes normalization 20 of FIG. 2, except that a further check 31 is made to see if the input is very small. Although the degree of smallness may be programmable by the user at the time of programmable device configuration, generally the degree of smallness that would trigger this further option is that entire upper half of the mantissa is zeroes. In such a case, the contribution of this number to the product of multiplier 32 would result in a zero output, resulting in a loss of all precision from this input. To avoid such a loss of precision, if CLZ 33 determines that the input is that small—i.e., that it includes only zeroes in the upper half of the mantissa—then the mantissa can be set to "1" at multiplexer 36 and the exponent adjusted at 34 by the position, in the unnormalized mantissa, of the first significant bit as determined by CLZ 35. This may at least preserve the order of magnitude of the input in computing multiplication 32.

A fifth example (not illustrated) is a variant of the fourth example, except that instead of checking for underflow on a bit-by-bit basis, groups of a small number of bits (e.g., 4-6 bits), as programmed by the user, are checked (as, e.g., by ORing the bits in the group) until a group that contains non-zero bits is found. When a non-zero group is found, the number is normalized to a place in that group—e.g., to the center of the group. This will preserve the magnitude of the input to within at least a few places. In this case, full precision will probably be maintained in the final result in embodiments, such as the 36-bit embodiment described above, in which the internal mantissa is much larger than the IEEE754-1985 mantissa.

Devices configured according to the remaining examples normalize the output, rather than the inputs. This may cut the required normalization circuitry or logic approximately in half. Thus, in these examples, shown in FIGS. 4 and 5, assuming that the inputs to multiplier 40, 50 have been treated so that there cannot be an overflow, underflow can be detected on the output.

Figure 4:
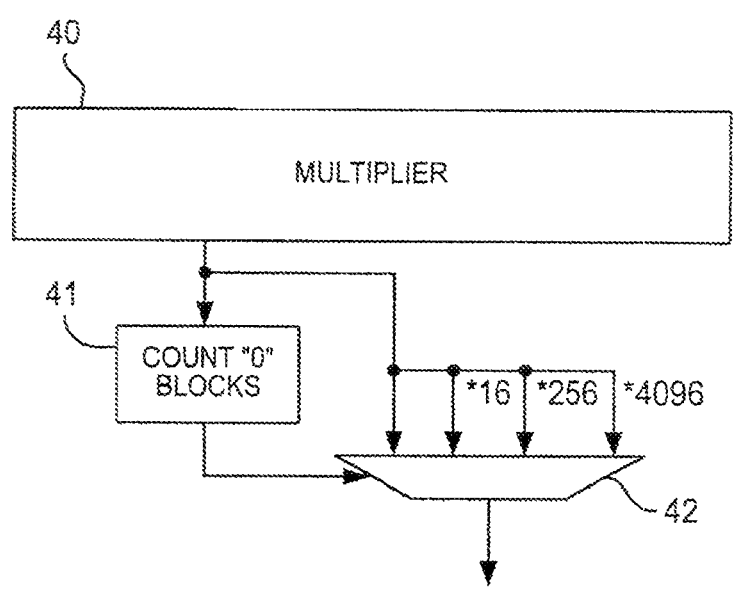
FIG. 4 is an example of a normalization configuration and method according to another embodiment of the present invention.

In the example shown in FIG. 4, the device is configured so that a "coarse" normalization similar to that of FIG. 3 is used. Specifically, groups of output bits are examined at CLZ 41, starting at the most significant bits, until a non-zero group is found, and the output is shifted to a place somewhere in that group (e.g., at or near the center of the group). In the embodiment shown, the shifting is performed by using multiplexer 42 to select a range of bits under the control of the output of CLZ 41, but a conventional shifting circuit could be used as in the examples above (and this multiplexer embodiment could be used in those examples instead of a shifting circuit). The exponent is adjusted accordingly (not shown).

Figure 5:
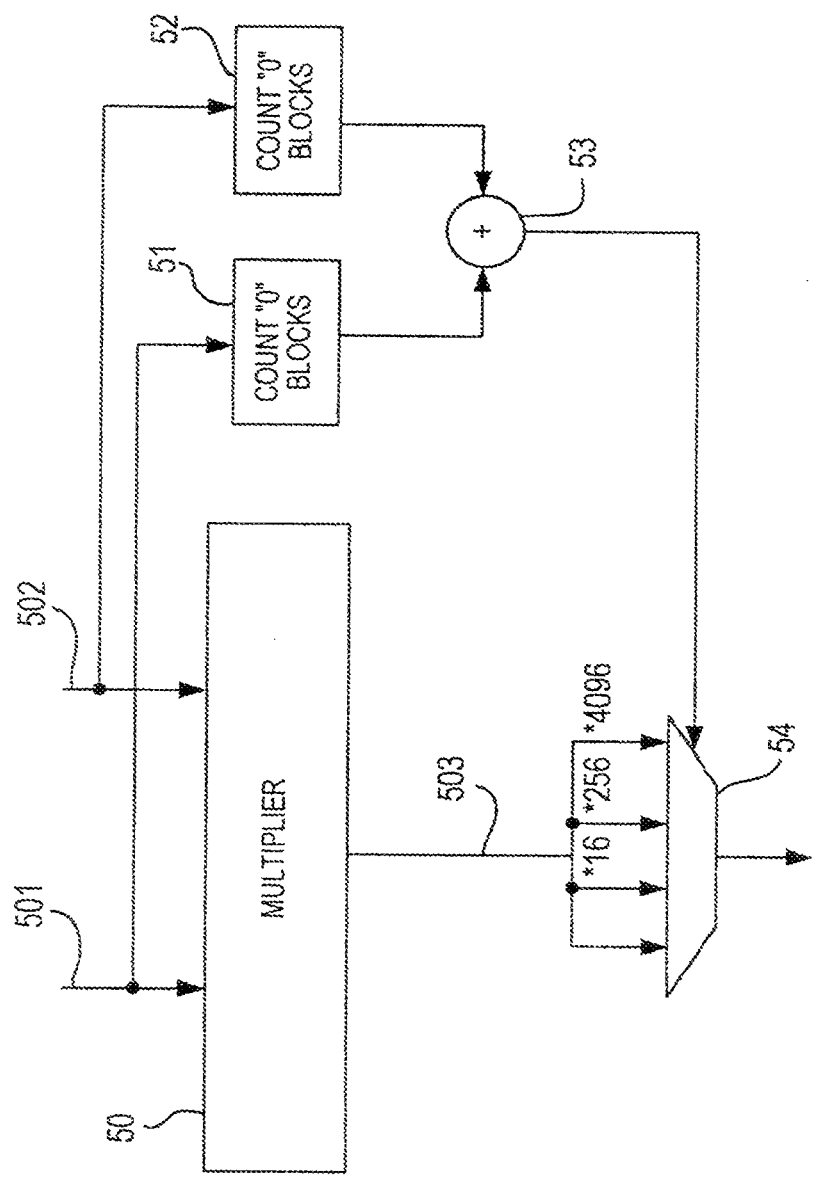
FIG. 5 is an example of a normalization configuration and method according to another embodiment of the present invention.

In the example shown in FIG. 5, the device is configured so that CLZ 51 and CLZ 52 are used to determine the locations of the first significant bit in each input 501, 502 to multiplier 50, which allows one to predict the location of the first significant bit in output 503. CLZ 51 and CLZ 52 could check for significant bits on either a bit-by-bit basis as in the first four examples above, or on a group basis (with any size group as may be programmed by the user) as in the latter two examples above. Again, in the embodiment shown, the shifting is performed by using multiplexer 54 to select a range of bits under the control of the output of CLZ 51 and CLZ 52 as combined at 53, but a conventional shifting circuit could be used. The exponent is adjusted accordingly (not shown).

Thus, the method of the invention configures a programmable integrated circuit device, such as a PLD, to examine the values (either input values or output values) associated with a multiplication operation in a programmable integrated circuit device and to adjust either the input or output values accordingly to prevent overflow. A device configured in accordance with the method can examine and adjust the input values, examine and adjust the output value, or examine the input values and adjust the output value.

The adjustment may be the same as normalizing to a standard such as the IEEE754-1985 standard, but need not be, and will depend on the CLZ count when the values are examined. It will be apparent that the adjustment is least likely to be same as normalization when the examination and/or adjustment of the values is carried out on a groups-of-bits basis rather than a bit-by-bit basis.

Instructions for carrying out the method according to this invention may be encoded on a machine-readable medium, to be executed by a suitable computer or similar device to implement the method of the invention for programming or configuring programmable integrated circuit devices to perform operations as described above. For example, a personal computer may be equipped with an interface to which a programmable integrated circuit device can be connected, and the personal computer can be used by a user to program the programmable integrated circuit device using a suitable software tool, such as the QUARTUS® II software available from Altera Corporation, of San Jose, Calif.

Figure 6:
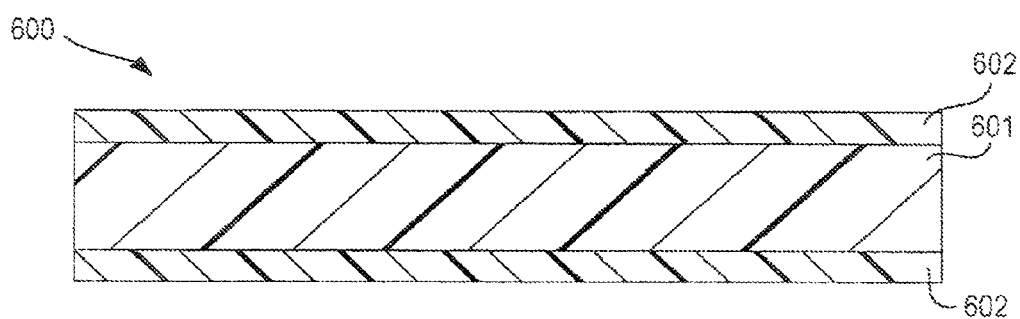
FIG. 6 is a cross-sectional view of a magnetic data storage medium encoded with a set of machine-executable instructions for performing the method according to the present invention.

FIG. 6 presents a cross section of a magnetic data storage medium 600 which can be encoded with a machine executable program that can be carried out by systems such as the aforementioned personal computer, or other computer or similar device. Medium 600 can be a floppy diskette or hard disk, or magnetic tape, having a suitable substrate 601, which may be conventional, and a suitable coating 602, which may be conventional, on one or both sides, containing magnetic domains (not visible) whose polarity or orientation can be altered magnetically. Except in the case where it is magnetic tape, medium 600 may also have an opening (not shown) for receiving the spindle of a disk drive or other data storage device.

The magnetic domains of coating 602 of medium 600 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 7:
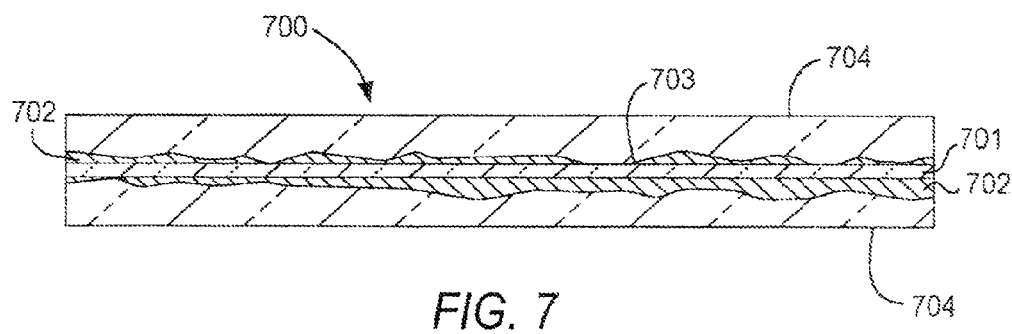
FIG. 7 is a cross-sectional view of an optically readable data storage medium encoded with a set of machine executable instructions for performing the method according to the present invention.

FIG. 7 shows a cross section of an optically-readable data storage medium 700 which also can be encoded with such a machine-executable program, which can be carried out by systems such as the aforementioned personal computer, or other computer or similar device. Medium 700 can be a conventional compact disk read only memory (CD-ROM) or digital video disk read only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 700 preferably has a suitable substrate 701, which may be conventional, and a suitable coating 702, which may be conventional, usually on one or both sides of substrate 701.

In the case of a CD-based or DVD-based medium, as is well known, coating 702 is reflective and is impressed with a plurality of pits 703, arranged on one or more layers, to encode the machine-executable program. The arrangement of pits is read by reflecting laser light off the surface of coating 702. A protective coating 704, which preferably is substantially transparent, is provided on top of coating 702.

In the case of magneto-optical disk, as is well known, coating 702 has no pits 703, but has a plurality of magnetic domains whose polarity or orientation can be changed magnetically when heated above a certain temperature, as by a laser (not shown). The orientation of the domains can be read by measuring the polarization of laser light reflected from coating 702. The arrangement of the domains encodes the program as described above.

Thus it is seen that a method for normalizing floating point operations, a programmable integrated circuit device programmed to perform the method, and software for carrying out the programming, have been provided.

Figure 8:
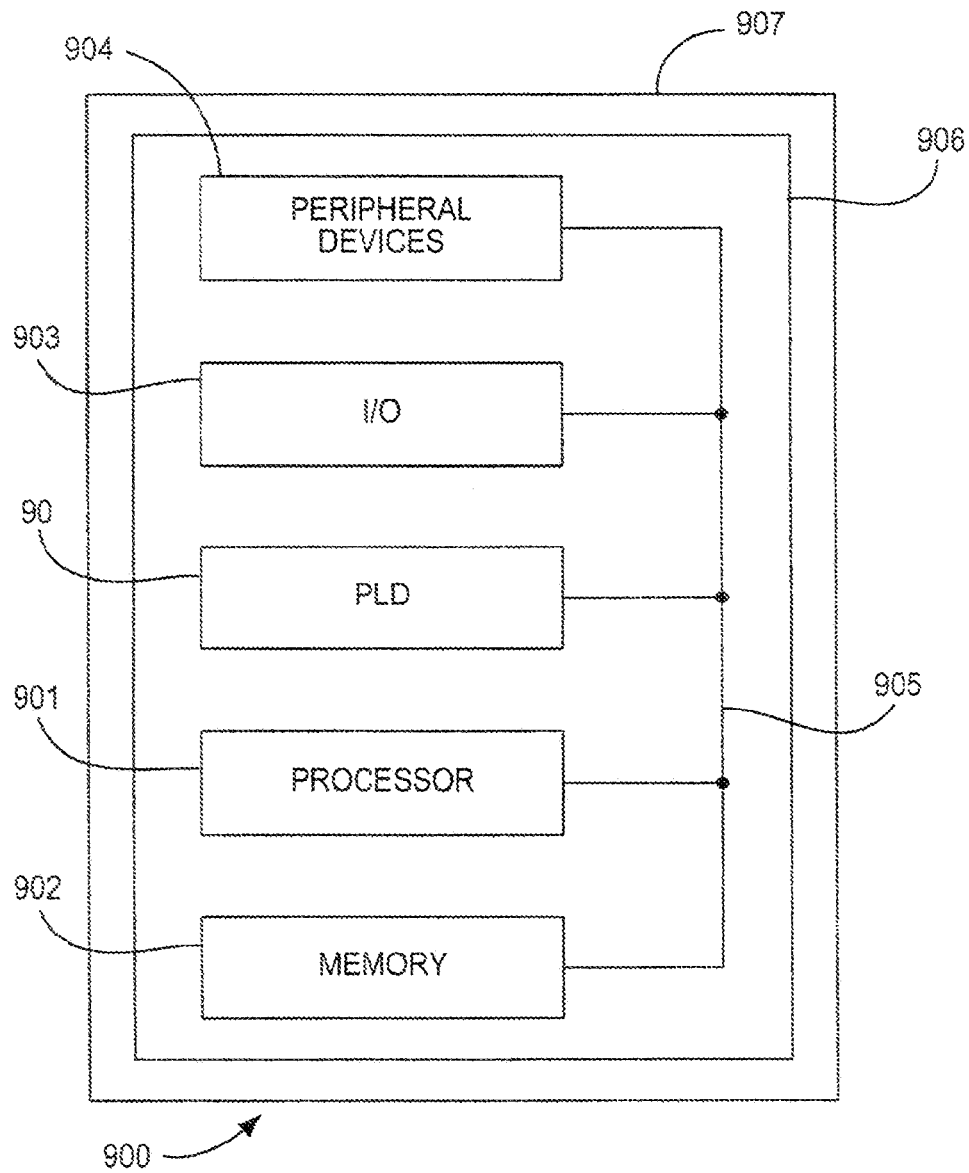
FIG. 8 is a simplified block diagram of an illustrative system employing a programmable logic device incorporating the present invention.

A PLD 90 programmed according to the present invention may be used in many kinds of electronic devices. One possible use is in a data processing system 900 shown in FIG. 8. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a programmable integrated circuit device in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A method of configuring a programmable integrated circuit device to perform a floating point multiplication operation on multiplicand input values to provide an output value, said method comprising:

configuring logic of said programmable integrated circuit device to examine said values to determine likelihood of overflow/underflow of said multiplication operation; and configuring logic of said programmable integrated circuit device to, based on said likelihood, adjust at least one of said values to prevent overflow/underflow of said multiplication operation.

2. The method of claim 1 wherein:

said multiplicand input values have a number of overflow bits;

said configuring logic of said programmable integrated circuit device to examine said values to determine likelihood of overflow/underflow of said multiplication operation comprises configuring said logic to compare said number of overflow bits to a number of adder stages feeding each said multiplicand input; and said configuring logic of said programmable integrated circuit device to, based on said likelihood, adjust said at least one said values to prevent overflow/underflow of said multiplication operation, comprises configuring said logic to, when said number of adder stages exceeds said number of overflow bits, shift a mantissa of at least one of said multiplicand input values and adjust a respective exponent of said at least one of said multiplicand input values accordingly.

3. The method of claim 1 wherein:

said configuring logic of said programmable integrated circuit device to examine said values to determine likelihood of overflow/underflow of said multiplication operation comprises configuring said logic to count bits to a first significant bit in each of said multiplicand input values to provide a respective bit count; and said configuring logic of said programmable integrated circuit device to, based on said likelihood, adjust said at least one of said values to prevent overflow/underflow of said multiplication operation, comprises configuring said logic to shift a respective mantissa of at least one of said multiplicand input values by said respective bit count and adjust a respective input exponent of said at least one of said multiplicand input values accordingly.

4. The method of claim 1 wherein:

said configuring logic of said programmable integrated circuit device to examine said values to determine likelihood of overflow/underflow of said multiplication operation comprises configuring said logic to count bits to a first significant bit in each of said multiplicand input values to provide a respective bit count; and said configuring logic of said programmable integrated circuit device to, based on said likelihood, adjust said at least one of said values to prevent overflow/underflow of said multiplication operation, comprises configuring said logic to shift a mantissa of said output value by a sum of said respective bit counts and adjust an exponent of said output value accordingly.

5. The method of claim 1 wherein:

said configuring logic of said programmable integrated circuit device to examine said values comprises configuring said logic to count bits to a first significant bit in said output value to provide a bit count; and said configuring logic of said programmable integrated circuit device to, based on said likelihood, adjust said at least one of said values to prevent overflow/underflow of said multiplication operation, comprises configuring said logic to shift a mantissa of said output value by said bit count and adjust an exponent of said output value accordingly.

6. The method of claim 1 wherein:

said configuring logic of said programmable integrated circuit device to examine said values comprises configuring said logic to examine said values bit-by-bit; and said configuring logic of said programmable integrated circuit device to, based on said likelihood, adjust said at least one of said values to prevent overflow/underflow of said multiplication operation, comprises configuring said logic to make bit-by-bit adjustments.

7. The method of claim 1 wherein:

said configuring logic of said programmable integrated circuit device to examine said values comprises configuring said logic to examine said values by groups of bits; and configuring logic of said programmable integrated circuit device to, based on said likelihood, adjust said at least one of said values to prevent overflow/underflow of said multiplication operation, comprises configuring said logic to make adjustments by groups of bits.

8. A programmable integrated circuit device configured to perform a floating point multiplication operation on multiplicand input values to provide an output value, said configured programmable logic device comprising:

logic configured to examine said values to determine likelihood of overflow/underflow of said multiplication operation; and logic configured to, based on said likelihood, adjust at least one of said values to prevent overflow/underflow of said multiplication operation.

9. The programmable integrated circuit device of claim 8 wherein:

said multiplicand input values have a number of overflow bits;

said logic configured to examine said values to determine likelihood of overflow/underflow of said multiplication operation is configured to compare said number of overflow bits to a number of adder stages feeding each said multiplicand input; and said logic configured to, based on said likelihood, adjust said at least one of said values to prevent overflow/underflow of said multiplication operation is configured to, when said number of adder stages exceeds said number of overflow bits, shift a mantissa of at least one of said multiplicand input values and adjust a respective exponent of said at least one of said multiplicand input values accordingly.

10. The programmable integrated circuit device of claim 8 wherein:

said logic configured to examine said values is configured to count bits to a first significant bit in each of said multiplicand input values to provide a respective bit count; and said logic configured to, based on said likelihood, adjust said at least one of said values to prevent overflow/underflow of said multiplication operation, is configured to shift a mantissa of at least one of said multiplicand input values by said respective bit count and adjust a respective exponent of said at least one of said multiplicand input values accordingly.

11. The programmable integrated circuit device of claim 8 wherein:

said logic configured to examine said values to determine likelihood of overflow/underflow of said multiplication operation is configured to count bits to a first significant bit in each of said multiplicand input values to provide a respective bit count; and said logic configured to, based on said likelihood, adjust said one of said values to prevent overflow/underflow of said multiplication operation, is configured to shift said a mantissa of said output value by a sum of said respective bit counts and adjust an exponent of said output value accordingly.

12. The programmable integrated circuit device of claim 8 wherein:

said logic configured to examine said values is configured to count bits to a first significant bit in said output value to provide a bit count; and said logic configured to, based on said likelihood, adjust said at least one of said values to prevent overflow/underflow of said multiplication operation, is configured to shift a mantissa of said output value by said bit count and adjust an exponent of said output value accordingly.

13. The programmable integrated circuit device of claim 8 wherein:
   said logic configured to examine said values is configured to examine said values bit-by-bit; and
   said logic configured to adjust said at least one of said values to prevent overflow/underflow is configured to make bit-by-bit adjustments.

14. The programmable integrated circuit device of claim 8 wherein:
   said logic configured to examine said values is configured to examine said values by groups of bits; and
   said logic configured to adjust said at least one of said values is configured to make adjustments by groups of bits.

15. A non-transitory machine-readable data storage medium encoded with machine-executable instructions for configuring a programmable integrated circuit device to perform a floating point multiplication operation on multiplicand input values to provide an output value, said instructions comprising:
   instructions to configure logic of said programmable integrated circuit device to examine said values to determine likelihood of overflow/underflow of said multiplication operation; and
   instructions to configure logic of said programmable integrated circuit device to, based on said likelihood, adjust at least one of said values to prevent overflow/underflow of said multiplication operation.

16. The non-transitory machine-readable data storage medium of claim 15 wherein:
   said multiplicand values have a number of overflow bits;
   said instructions to configure logic of said programmable integrated circuit device to examine said values to determine likelihood of overflow/underflow of said multiplication operation comprise instructions to configure said logic to compare said number of overflow bits to a number of adder stages feeding each said multiplicand input; and
   said instructions to configure logic of said programmable integrated circuit device to, based on said likelihood, adjust said at least one of said values to prevent overflow/underflow of said multiplication operation, comprise instructions to configure said logic to, when said number of adder stages exceeds said number of overflow bits, shift a mantissa of at least one of said multiplicand input values and adjust a respective exponent of said at least one of said multiplicand input values accordingly.

17. The non-transitory machine-readable data storage medium of claim 15 wherein:
   said instructions to configure logic of said programmable integrated circuit device to examine said values to determine likelihood of overflow/underflow of said multiplication operation comprise instructions to configure said logic to count bits to a first significant bit in each of said multiplicand input values to provide a respective bit count; and
   said instructions to configure logic of said programmable integrated circuit device to, based on said likelihood, adjust said at least one of said values to prevent overflow/underflow of said multiplication operation, comprise instructions to configure said logic to shift a mantissa of at least one of said multiplicand input values and adjust a respective exponent of said at least one of said multiplicand input values accordingly.

18. The non-transitory machine-readable data storage medium of claim 15 wherein:
   said instructions to configure logic of said programmable integrated circuit device to examine said values to determine likelihood of overflow/underflow of said multiplication operation comprise instructions to configure said logic to count bits to a first significant bit in each of said multiplicand input values to provide a respective bit count; and
   said instructions to configure logic of said programmable integrated circuit device to, based on said likelihood, adjust said at least one of said values to prevent overflow/underflow of said multiplication operation, comprise instructions to configure said logic to shift a mantissa of said output value by a sum of said respective bit counts and adjust an exponent of said output value accordingly.

19. The non-transitory machine-readable data storage medium of claim 15 wherein:
   said instructions to configure logic of said programmable integrated circuit device to examine said values to determine likelihood of overflow/underflow of said multiplication operation comprise instructions to configure said logic to count bits to a first significant bit in said output value to provide a bit count; and
   said instructions to configure logic of said programmable integrated circuit device to, based on said likelihood, adjust said at least one of said values to prevent overflow/underflow of said multiplication operation, comprises configuring said logic to shift a mantissa of said output value by said bit count and adjust an exponent of said output value accordingly.

20. The non-transitory machine-readable data storage medium of claim 15 wherein:
   said instructions to configure logic of said programmable integrated circuit device to examine said values comprises a respective one of (a) configuring said logic to examine said values bit-by-bit, or (b) configuring said logic to examine said values by groups of bits; and
   said configuring logic of said programmable integrated circuit device to, based on said likelihood, adjust said at least one of said values to prevent overflow/underflow of said multiplication operation, comprises a respective one of (a) configuring said logic to make bit-by-bit adjustments, or (b) configuring said logic to make adjustments by groups of bits.

* * * * *